US010480641B2

(12) United States Patent
Ziemer et al.

(10) Patent No.: US 10,480,641 B2
(45) Date of Patent: Nov. 19, 2019

(54) ASSEMBLY FOR BLOCKING AND ENABLING A SHIFTING POSITION OF A SHIFTING ELEMENT

(71) Applicant: ZF Friedrichshafen AG, Friedrichshafen (DE)

(72) Inventors: Peter Ziemer, Tettnang (DE); Josef Haupt, Tettnang (DE); Christoph Margraf, Markdorf (DE); Markus Herrmann, Scheidegg (DE); Thilo Schmidt, Meckenbeuren (DE); Ulrich Doerr, Constance (DE); Christian Sibla, Eriskirch (DE); Stefan Beck, Eriskirch (DE); Maik Wiesner, Weingarten (DE); Stefan Brom, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 295 days.

(21) Appl. No.: 15/505,443

(22) PCT Filed: Jul. 21, 2015

(86) PCT No.: PCT/EP2015/066589
§ 371 (c)(1),
(2) Date: Feb. 21, 2017

(87) PCT Pub. No.: WO2016/026637
PCT Pub. Date: Feb. 25, 2016

(65) Prior Publication Data
US 2017/0268660 A1    Sep. 21, 2017

(30) Foreign Application Priority Data
Aug. 21, 2014 (DE) .......... 10 2014 216 578

(51) Int. Cl.
*F16H 61/00* (2006.01)
*F16H 63/30* (2006.01)
(Continued)

(52) U.S. Cl.
CPC ......... *F16H 61/0021* (2013.01); *F15B 13/01* (2013.01); *F16H 61/30* (2013.01);
(Continued)

(58) Field of Classification Search
CPC .. F16H 61/0021; F16H 61/0276; F16H 61/30; F16H 2061/0279; F16H 63/3026;
(Continued)

(56) References Cited

U.S. PATENT DOCUMENTS 2,888,117 A * 5/1959 Imblum .................. F16D 31/02
                                                192/48.611
4,274,107 A    6/1981  Iwanaga et al.
(Continued)

FOREIGN PATENT DOCUMENTS

DE    2934921 A1    3/1980
DE    19813981 A1   9/1999
(Continued)

OTHER PUBLICATIONS

German Search Report DE102014216578.4, dated Jun. 23, 2015, (10 pages).
(Continued)

*Primary Examiner* — Huan Le
(74) *Attorney, Agent, or Firm* — Dority & Manning, P.A.

(57) ABSTRACT

A system for locking and releasing a shifting position of a shifting element that is hydraulically actuatable by an actuating pressure is provided. The shifting element is arranged coaxially with a transmission shaft. The system includes a stop valve. The stop valve is subjectable to a control pressure that is separate from the actuating pressure of the shifting
(Continued)

element. The stop valve is arranged radially inside the shifting element in the transmission housing.

26 Claims, 11 Drawing Sheets

(51) Int. Cl.
*F15B 13/01* (2006.01)
*F16H 61/30* (2006.01)
*F16K 31/122* (2006.01)
*F16K 35/06* (2006.01)

(52) U.S. Cl.
CPC ..... *F16H 63/3026* (2013.01); *F16K 31/1221* (2013.01); *F16K 35/06* (2013.01)

(58) Field of Classification Search
CPC ............. F16H 61/00; F16D 2048/0221; F16D 2048/0278; F15B 13/01; F16K 31/1221; F16K 35/06
See application file for complete search history.

(56) References Cited

U.S. PATENT DOCUMENTS

| | | | |
|---|---|---|---|
| 6,544,139 | B1 | 4/2003 | Gierer et al. |
| 2015/0240938 | A1 | 8/2015 | Nakano et al. |
| 2016/0230880 | A1 | 8/2016 | Beck et al. |

FOREIGN PATENT DOCUMENTS

| | | |
|---|---|---|
| DE | 19858541 A1 | 6/2000 |
| DE | 10205411 A1 | 8/2003 |
| DE | 102013221035 A1 | 4/2015 |
| JP | 2010242852 A | 10/2010 |
| WO | WO 2014050452 A1 | 4/2014 |

OTHER PUBLICATIONS

International Search Report (English Translation) PCT/EP2015/066589, dated Oct. 8, 2015. (2 pages).

* cited by examiner

ASSEMBLY FOR BLOCKING AND ENABLING A SHIFTING POSITION OF A SHIFTING ELEMENT

FIELD OF THE INVENTION

The present invention relates generally to an arrangement for locking and releasing a shifting position of a shifting element that can be actuated hydraulically with actuating pressure, in a transmission housing arranged coaxially at a transmission shaft.

BACKGROUND

Shifting elements, such as clutches or the like in automatic transmissions, as known from DE 198 58 541 A1, are typically kept closed by hydraulically actuated pistons with corresponding actuation pressure in the clutch cylinder. The pressurized oil is guide in the transmission housing to the clutch cylinder or to the clutch piston by rotating elements, which are sealed by gap seals, for example slide bearings or rectangular rings. At high clutch pressures during the shifting of the clutch, such rotary feedthroughs experience high losses due to leakages. In order to prevent leakage losses for closed (that is, actuated) shifting elements or clutches, locking mechanisms controlled depending on the actuation pressure are known. However, such locking mechanisms require a large amount of installation space, and are thus not neutral either in terms of weight or cost.

SUMMARY OF THE INVENTION

Exemplary aspects of the present invention provide an arrangement for locking and releasing a shifting position of a shifting element, which is integrated into an existing shift element that is as neutral in terms of installation space and weight as is possible, and can be controlled independently of the actuating pressure.

Thus, an arrangement with at least one shifting element hydraulically actuated by an actuating pressure is proposed and in which the at least one shifting element is arranged coaxially at a centrally arranged transmission shaft in a transmission housing of an automatic transmission of a vehicle. The arrangement includes at least one return flow locking valve or stop valve for locking and releasing the shifting position or the closed position of the shifting element. The stop valve can be subjected to a separate control pressure or locking pressure independently of the shifting element. The stop valve is arranged radially inside the shifting element in the transmission housing.

In this manner, the shiftable stop valve can be integrated into an existing shifting element, in particular into a clutch of an automatic transmission, for the purpose of avoiding leakage. The stop valve may provide for the hydraulic or even mechanical locking and releasing of the at least one shifting element.

Within the framework of a hydraulic locking, a fluid chamber or clutch cylinder of the shifting element that is subjected to actuating pressure is locked or released with the stop valve. However, within the framework of a possible mechanical locking, the stop valve is used to lock an actuating element or a clutch piston of the shifting element in the shifted or engaged position, and to release the actuating element or the clutch piston when required.

Depending on the design and the selected application, the stop valve can comprise a one-part locking body or a multi-part locking body, which, for example, features a cylindrical or ring-shaped piston element or the like, for actuation (for example), and, if applicable, a closure element corresponding to a valve seat for locking and releasing a feed channel into the fluid chamber of the shifting element and/or into the clutch cylinder of the clutch.

Particularly when using ring-shaped or similarly designed locking bodies, a hydrodynamic pressure compensation in the stop valve arises because of the fact that oil or hydraulic fluid can be accumulated on the side of the restoring element.

With the proposed arrangement, the stop valve can be arranged within the transmission shaft but also radially outside the transmission shaft. The locking body is designed to be axially displaceable. The closure element corresponding to the valve seat can be equipped, for example, with O-ring seals or also with vulcanized sealing elements during hydraulic locking. In particular, a cone seat or a plate seat can be used as the valve seat. Through selectively introduced diameter differences in the area of the valve seat, the restoring element is supported by the clutch pressure in the closed state. Other constructive designs, which offer the corresponding properties, are also possible.

Preferably, spring elements, for example a plate or a wave spring, can be used as restoring elements, in order to hold the locking body or the stop valve in a closed position of the locking body or the stop valve.

Independent of the respective designs, the stop valve is subjected to a separate control pressure. The position of the stop valve is changed when subjected to control pressure. For example, the closed position of the stop valve can be realized by the restoring element, such that a valve seat position that releases the feed channel into the fluid chamber or into the cylinder chamber of the clutch is achieved when the control pressure is applied. Upon a mechanical locking of the shifting element or of the clutch, through subjecting the shifting element or of the clutch to control pressure, a position latching or locking the actuating element of the shifting element or the clutch piston of the clutch can be achieved.

The actuation of the stop valve by subjecting the stop valve to control pressure, independent of the actuating pressure of the shifting element, is particularly advantageous.

By the arrangement proposed in accordance with example aspects of the invention, by avoiding leaks at the shifting element in the actuated state through a pressure release or through a mechanical latching, a relief of the sealing elements on the rotary transmission is made possible, in order to thus minimize the hydraulic losses. This results in a demand-oriented pump that is comparatively small and consequently more efficient in terms of drag torque, in conjunction with a pressure reservoir, which ultimately leads to an improvement in consumption. As a result, additional functionalities in the automatic transmission, such as, for example, coasting when the drive motor is switched off, are possible.

With the proposed arrangement, it is also possible, for example, that a fluid reservoir is provided for actuating the clutch, in order to compensate for slight hydraulic losses, for example during switching. In this case, the fluid reservoir is formed by a piston that is integrated into the clutch actuating piston and is equipped with a holding pressure spring.

BRIEF DESCRIPTION OF THE DRAWINGS

The present invention is further described below with reference to the drawings. The following is shown.

DETAILED DESCRIPTION

Figure 1:
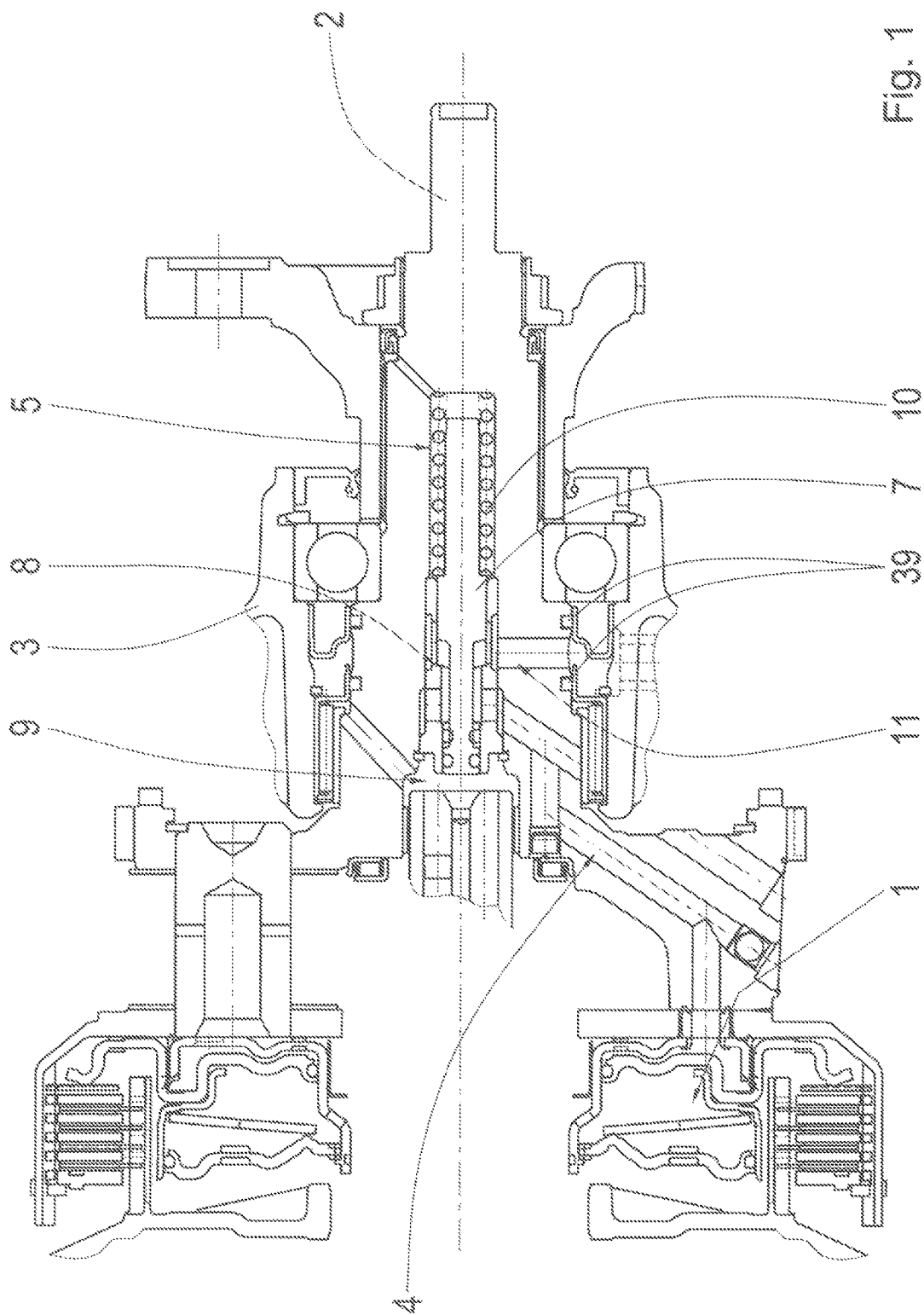
FIG. 1 a schematic partial view of an automatic transmission with a first design variant of an arrangement in accordance with example aspects of the invention, with a stop valve arranged within the transmission shaft.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIGS. 1 to 11A present examples of the proposed arrangement in accordance with example aspects of the invention on the basis of various design variants and embodiments. The arrangement includes at least one shifting element that can be actuated hydraulically by an actuating pressure, for example as a clutch 1, 1A, which is arranged coaxially at or on at least one transmission shaft 2 in a transmission housing 3 of an automatic transmission of a vehicle. Furthermore, the arrangement comprises at least one return flow locking valve or stop valve for locking and releasing the shifting position or the closed position of the clutch 1, 1A.

According to the respective design variants, the stop valve can be controlled through a separate control pressure that is independent of the actuation of the shifting element or the clutch 1, 1A. The stop valve is arranged radially inside the clutch 1, 1A in the transmission housing 3.

With the first, second, third, fourth and fifth example design variants according to FIGS. 1 to 8A, the stop valve is provided with a locking body that can be subjected to control pressure for hydraulically locking and releasing a fluid chamber or clutch cylinder 4 of the clutch 1, 1A that is subjected to actuating pressure.

Figure 2:
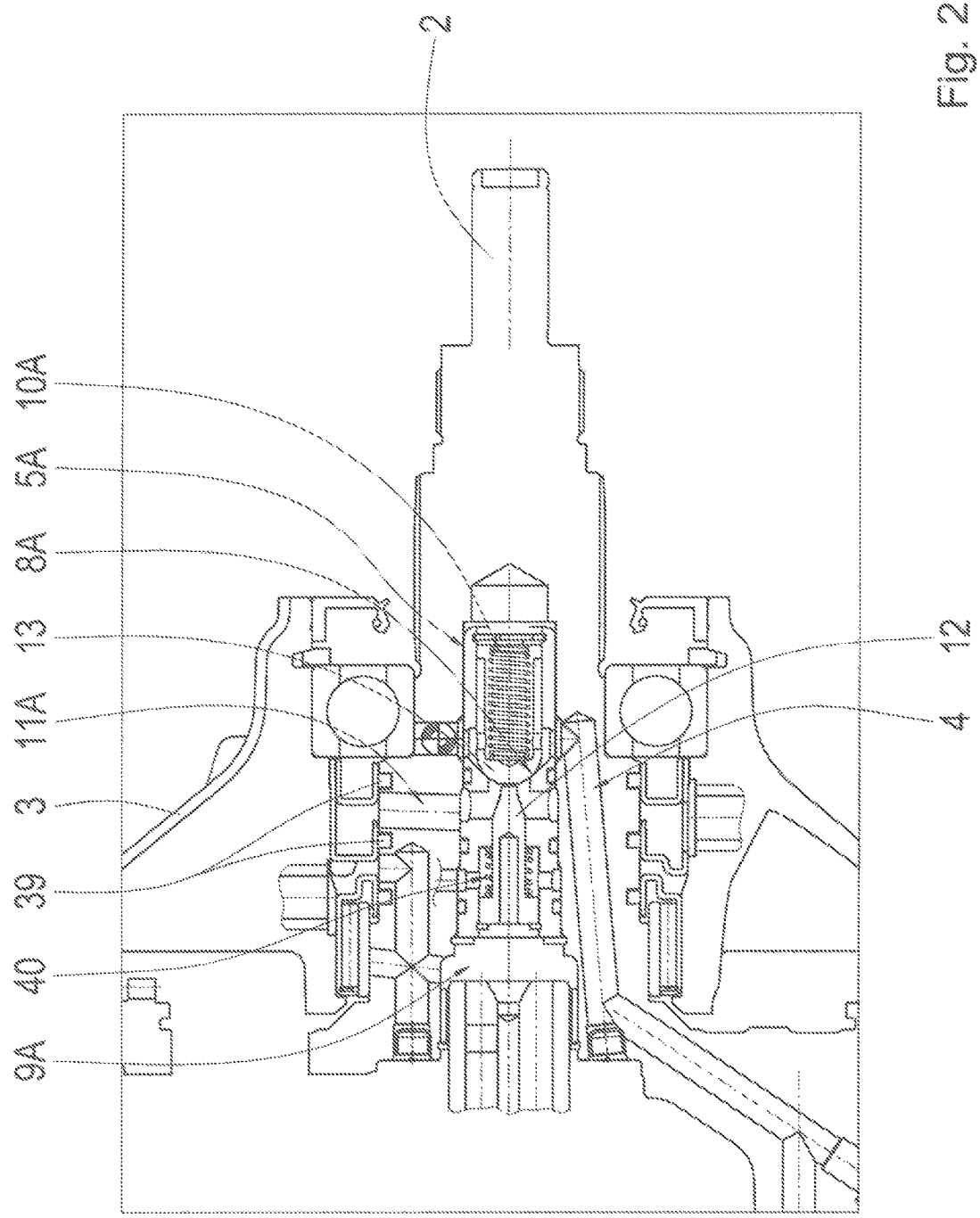
FIG. 2 an alternative example design in accordance with FIG. 1.

With the first example design variant in accordance with FIGS. 1 and 2, the stop valve is arranged in an axial bore 5 of the transmission shaft 2 arranged centrally in the transmission housing 3. Thus, the stop valve is arranged radially inside a guide sleeve 6 that encases the transmission shaft 2.

With the example embodiment shown in FIG. 1, the stop valve, as a locking body, features a piston 7 that can be moved axially in the axial bore 5 and that interacts with a valve seat 8 of the axial bore 5. Thus, with this design, a one-part locking body for the stop valve is provided. A pressure chamber 9 that can be subjected to control pressure in the axial bore 5 is assigned to a first end of the piston 7; a restoring element or spring element 10 is assigned to a second end of the piston 7. When subjected to control pressure, the piston 7 is axially displaceable from a valve seat position releasing the feed channel 11 of the fluid chamber 4. Rectangular rings 39 are provided for sealing purposes.

FIG. 2 shows an alternative embodiment of the first example design variant, with which the stop valve features a multi-part locking body with an axially movable actuating piston 12 that can be subjected to control pressure and with an axially movable closure piston 13 that interacts with a valve seat 8A of the axial bore 5A. The actuating piston 12 is assigned to a pressure chamber 9A, which can be subjected to control pressure, in the axial bore 5A. When subjected to control pressure, the actuating piston 12 is in operative connection with the closure piston 13 in such a manner that the closure piston 13 can be brought into a valve seat position that releases the feed channel 11A of the fluid chamber 4A, against the force of a restoring element or a restoring spring 10A. In order to restore the actuating piston 12 to an initial position, an additional spring element 14 is provided. On the side turned towards the actuating piston 12, the closure piston 13 has a spherical shape, which is adapted to the valve seat 8A.

Figure 3:
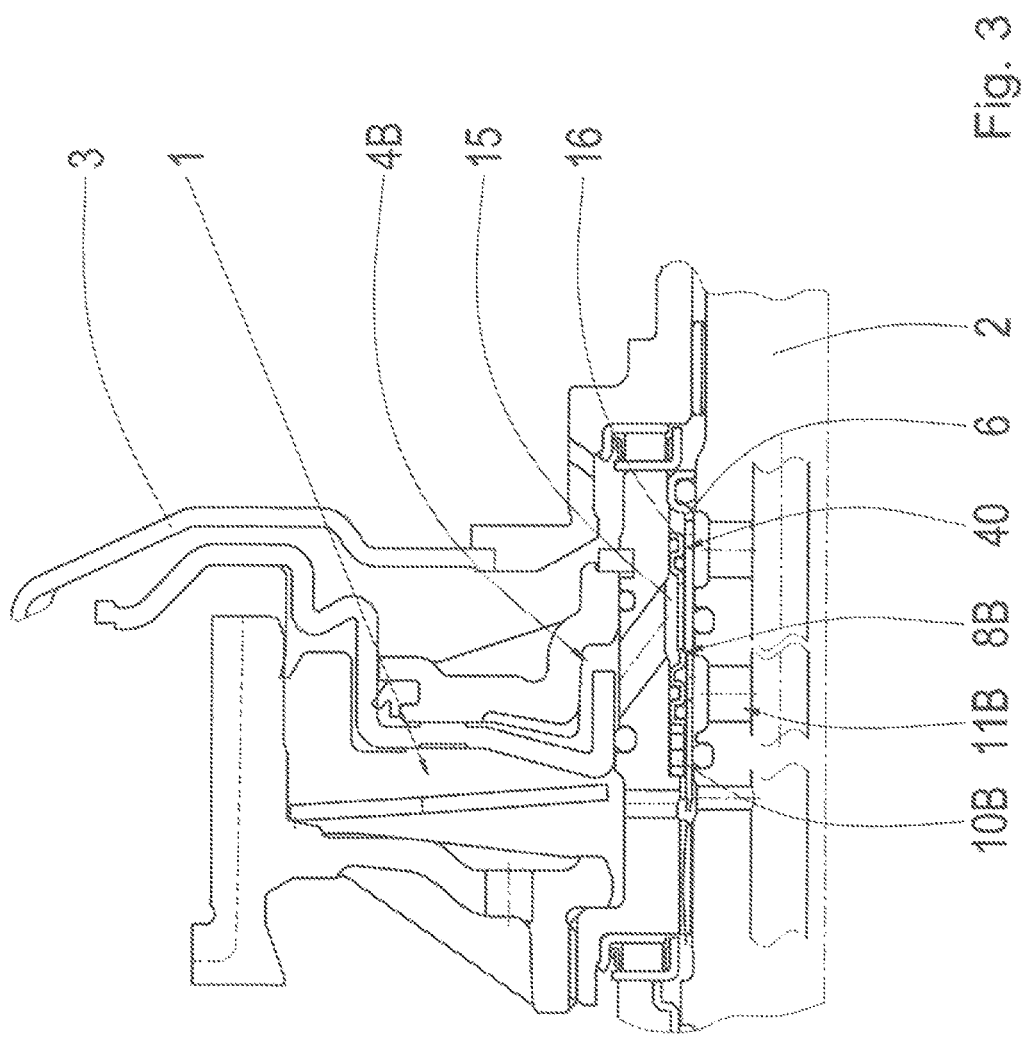
FIG. 3 a schematic partial view of an automatic transmission with a second design variant of the arrangement in accordance with example aspects of the invention, with a stop valve arranged radially outside the transmission shaft.
Figure 4:
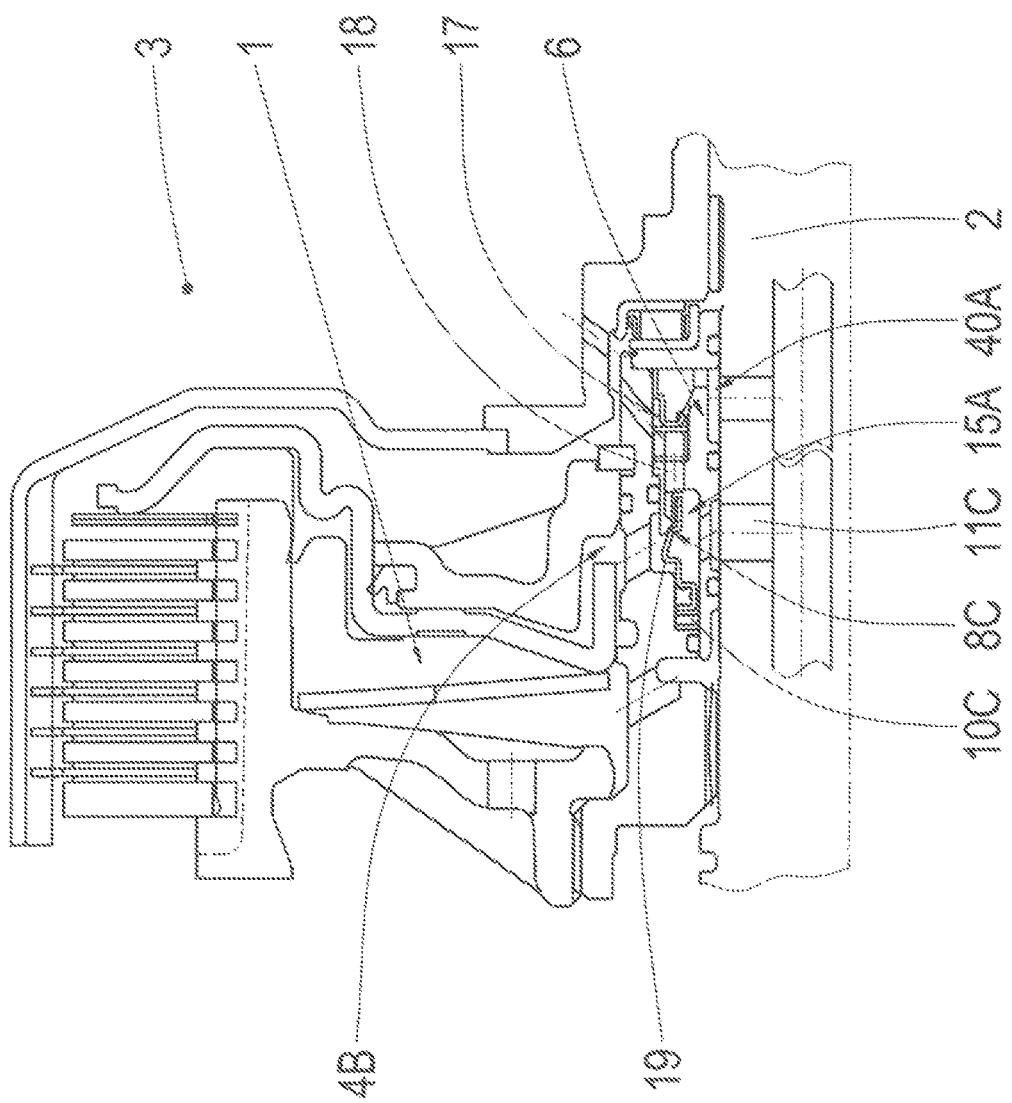
FIG. 4 an alternative example design in accordance with FIG. 3.
Figure 5:
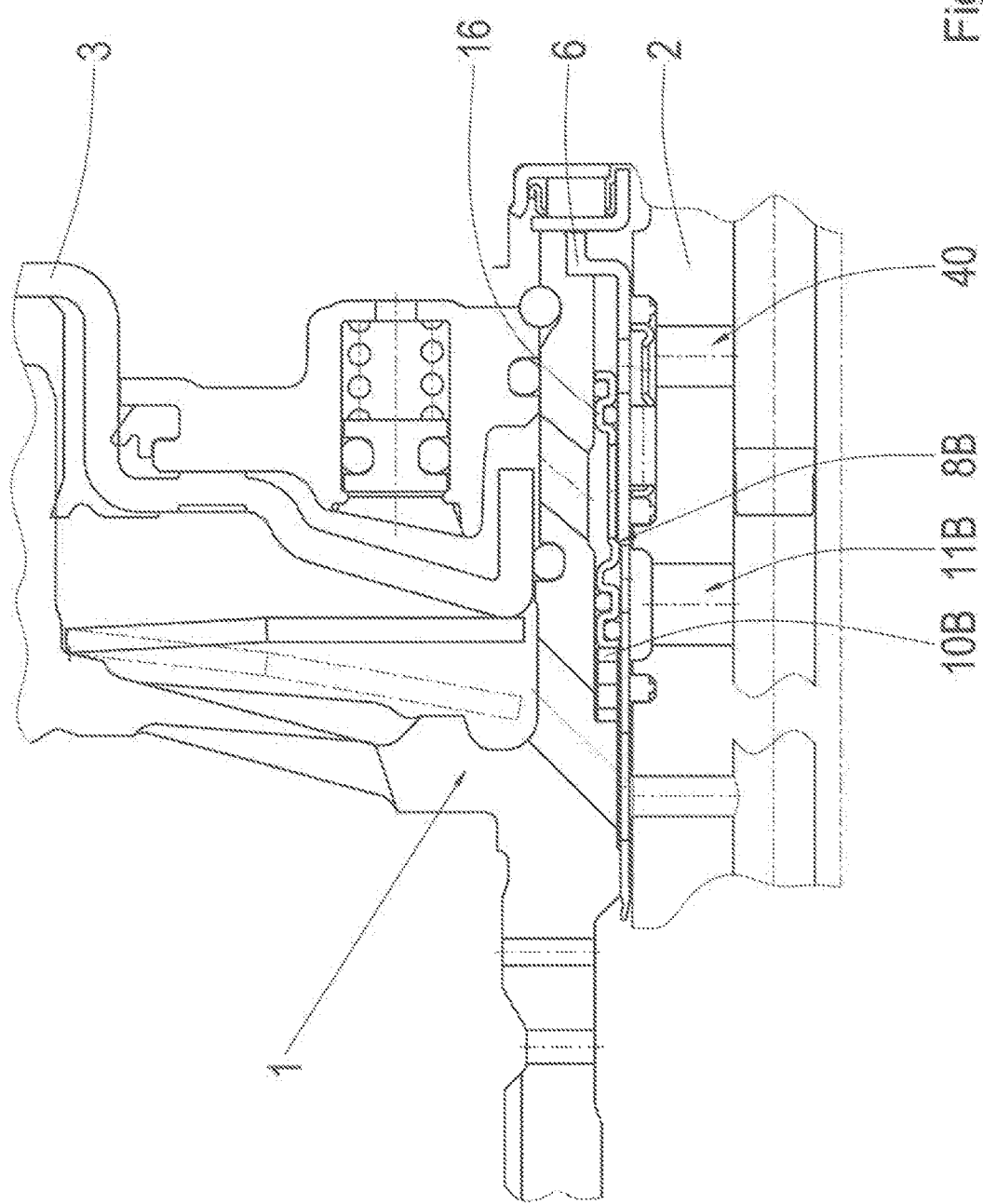
FIG. 5 an additional alternative example design in accordance with FIG. 3.

FIGS. 3 to 5 show a second design variant of the arrangement in accordance with example aspects of the invention, with which the stop valve is arranged radially between the transmission shaft 2 and the fluid chamber 4B of the clutch 1, which is designed as a clutch cylinder. The stop valve is arranged in an annular space 15, 15A formed between the guide sleeve 6, which is arranged coaxially at the transmission shaft 2, and the clutch 1.

FIG. 3 shows a design of the second example design variant, with which a sleeve-shaped piston element 16 is provided as the locking body. Thus, with this design, a one-part locking body is provided for the stop valve. The piston element 16 is arranged in an axially movable manner in the annular space 15, and interacts with the valve seat 8B of the annular space 15. The first end of the piston element 16 is assigned to an area 40 of the annular space 15 that can be subjected to control pressure, and a second end of the piston element 16 is assigned to a restoring element or spring 10B, such that, when subjected to control pressure, the piston element 16 is displaceable into a valve seat position that releases the feed channel 11B of the fluid chamber 4C.

FIG. 4 shows an arrangement of the second example design variant, with which the stop valve features a multi-part locking body that is axially movable into the annular space 15A. The locking body includes a ring-shaped actuating piston 17, at least one pin 18 in operative connection with the actuating piston 17 and a closure sleeve 19 in operative connection with the pin 18 and a valve seat 8C. The actuating piston 17 is arranged in an area 40A of the ring-shaped chamber 15A that is subjected to control pressure. The closure sleeve 19 rests against the valve seat 8C through a restoring element 10C. When subjected to control pressure, the actuating piston 17 moves the closure sleeve 19 into a valve seat position releasing the feed channel 11C.

FIG. 5 shows an alternative arrangement of the second example design variant in accordance with FIG. 3, with which the arrangement is provided that the stop valve with the guide sleeve 6 and the shifting element 1 is rotatably mounted on the transmission shaft or drive shaft 2.

Figure 6:
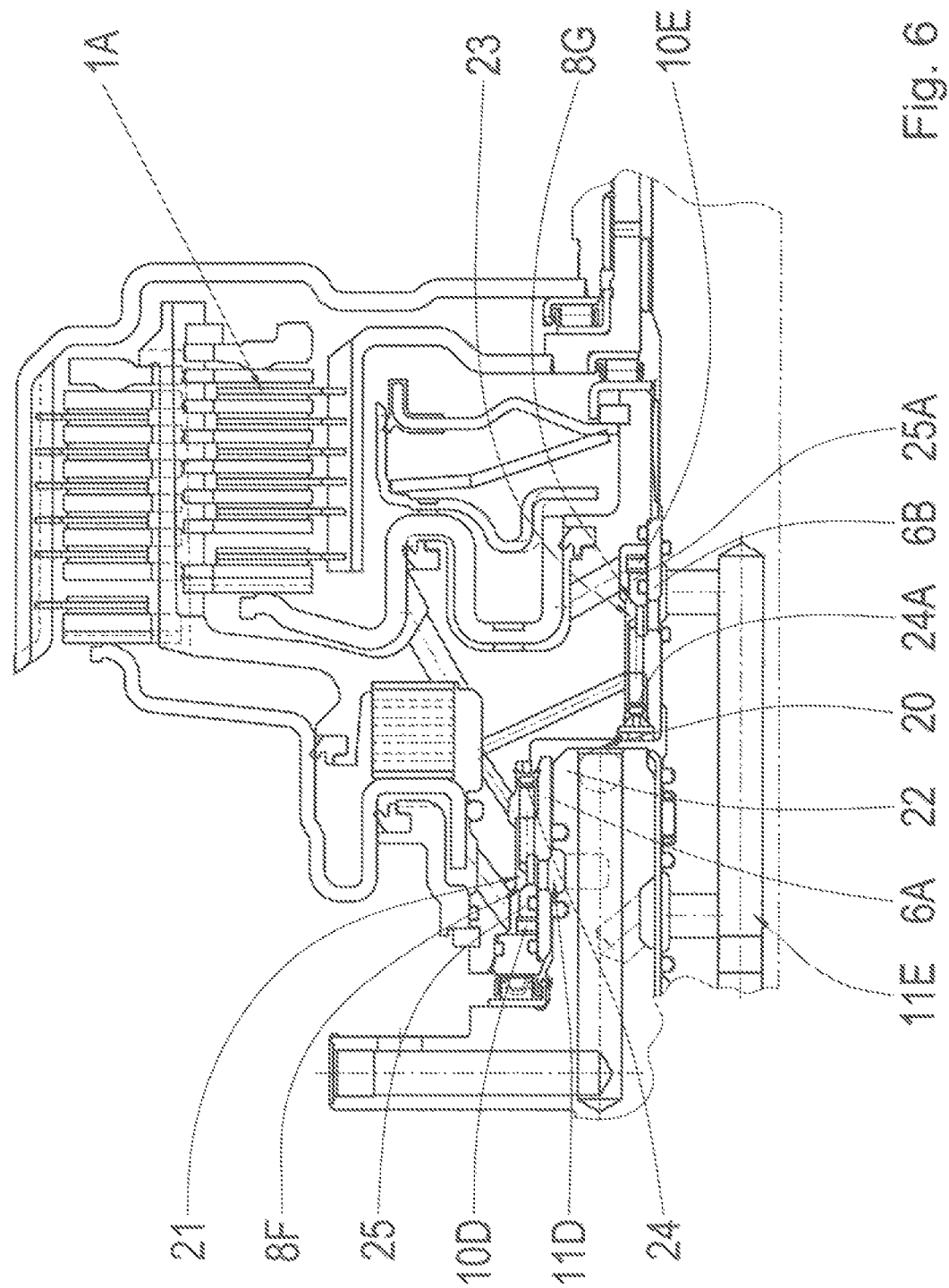
FIG. 6 a third design variant of the arrangement in accordance with example aspects of the invention, with a multiple number of stop valves for controlling a multiple number of shifting elements.

FIG. 6 shows a third design variant of the arrangement in accordance with example aspects of the invention, with which a multiple number of stop valves, which can be controlled through a common control pressure connection 20, are provided for releasing and locking the respective feed channels 11D, 11E of a multiple number of clutches 1, 1A. The first stop valve is arranged with the associated guide sleeve 6A on a housing stub 22, radially inside the first clutch 1, and forms a first annular space 21. A second stop valve is arranged in a second annular space 23 in a coaxial manner between the guide sleeve 6B connected to the transmission shaft 2 and the clutches 1, 1A to be released or locked in the shifting position.

Each stop valve features a multi-part locking body, which can be axially moved in the associated annular space 21, 23, with an unlocking piston 24, 24A and a ring-shaped closure element 25, 25A. A first end of each unlocking piston 24, 24A is assigned to the common control pressure port 20, whereas a second end of each unlocking piston 24, 24A is in operative connection with the closure element 25, 25A that is pretensioned against a valve seat 8F, 8G by a restoring element 10D, 10E, such that, when subjected to control pressure, each closure element 25, 25 A can be brought into the valve seat position releasing the respective feed channel 11 D, 11 E of the assigned clutch 1, 1 A by the respective unlocking piston 24, 24 A.

In particular with the embodiments of the arrangement in accordance with example aspects of the invention shown in FIGS. 5 and 6, a further reduction in construction effort and costs is obtained by the fact that at least one additional stop valve for locking and releasing an additional shifting element or an additional clutch 1, 1A can be actuated by the control pressure.

Figure 7:
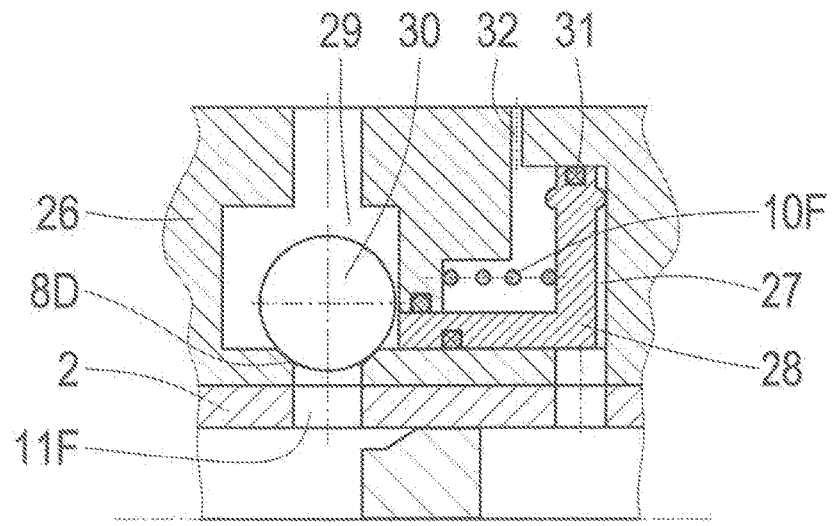
FIG. 7 a sectional partial view of a fourth design variant of the arrangement in accordance with example aspects of the invention, with a stop valve arranged within an additional transmission shaft.
Figure 8:
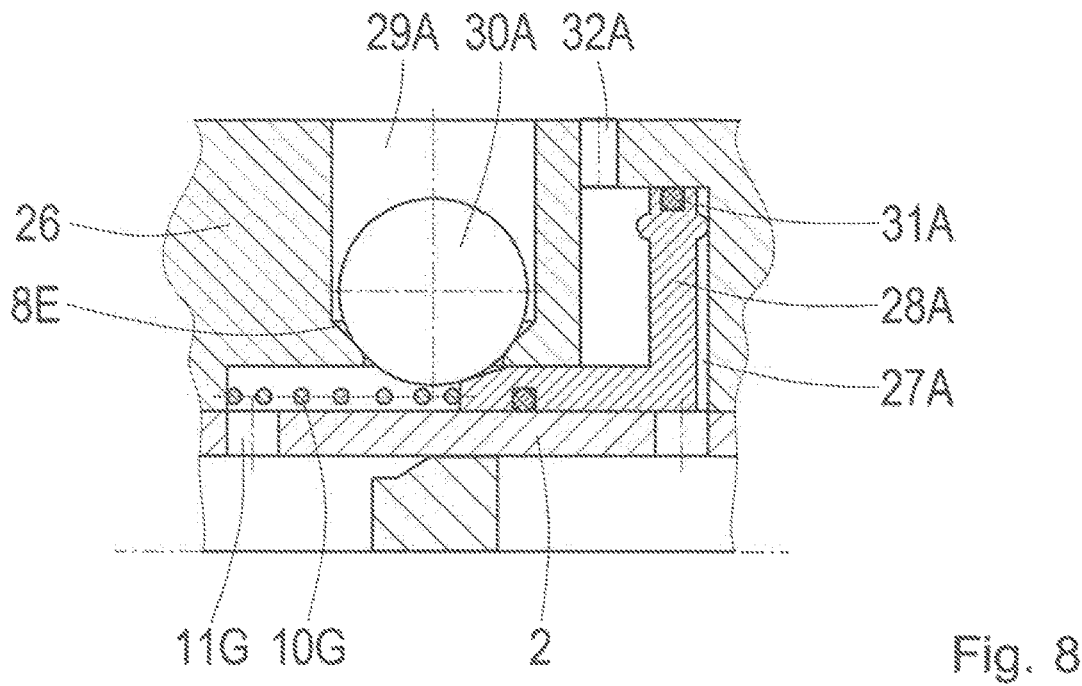
FIG. 8 a schematic view of a fifth design variant of the arrangement in accordance with example aspects of the invention, with an alternative embodiment of a locking element arranged in the transmission shaft.
Figure 9:
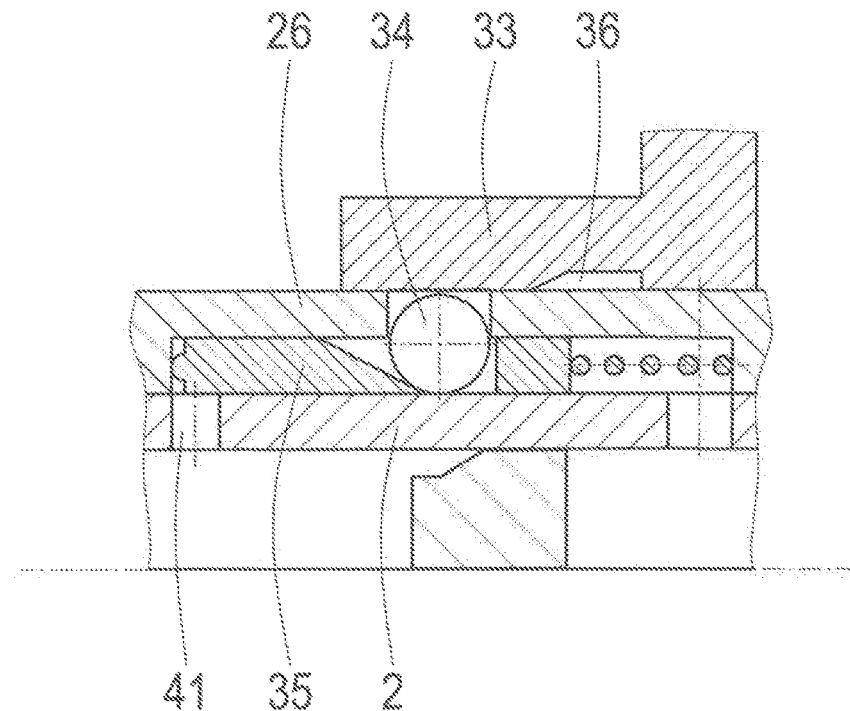
FIG. 9 a schematic view of a sixth design variant of the arrangement in accordance with example aspects of the invention, with a stop valve mechanically locking the shifting position.

FIGS. 7 to 9 A show a fourth, fifth and sixth example design variant, with which the stop valve is arranged within a second transmission shaft 26 that is arranged coaxially at the first transmission shaft 2. In this case, i a multiple number of stop valves may be arranged axially next to each other in the second transmission shaft 26.

Figure 7A:
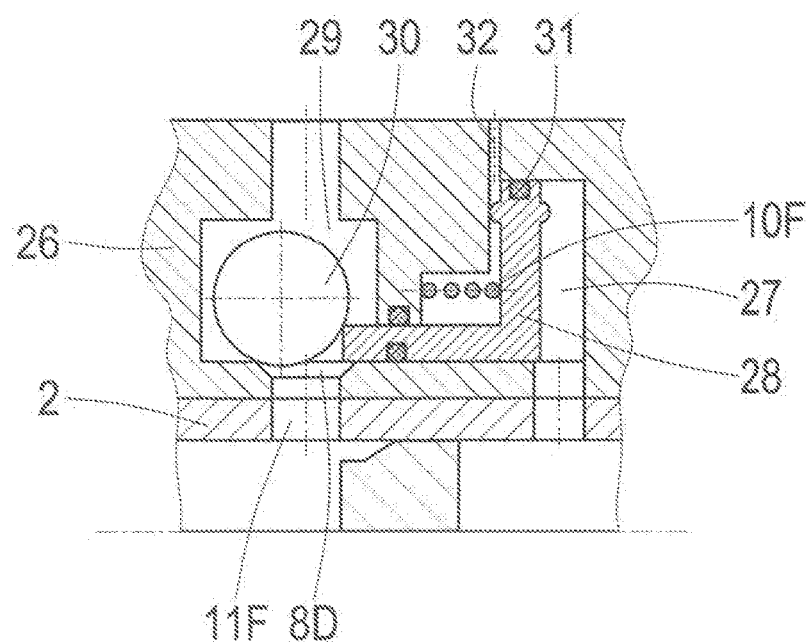
FIG. 7A an additional illustration of the fourth example design variant in accordance with FIG. 7.

With the fourth example design variants shown in FIGS. 7 and 7A, the stop valve features a multi-part locking body with a piston element 28 arranged in a first annular space 27 that is subjected to control pressure, and a spherical closure element 30 arranged in a second annular space 29 that is subjected to actuating pressure. The second annular space 29 features a valve seat 8D, which is in operative connection with the closure element 30. The closure element 30 in turn is in operative connection with the piston element 28. When subjected to control pressure, the piston element 28 is pressed against the spherical closure element 30 against the force of a restoring element 10F, such that the closure element 30 can be brought into a valve seat position releasing the feed channel 11F.

FIG. 7 shows the closed position (thus, the position closing the feed channel 11F; FIG. 7A shows the position releasing the feed channel 11F, with which the closure element 30 is moved axially and radially away from the valve seat 8D.

Figure 8A:
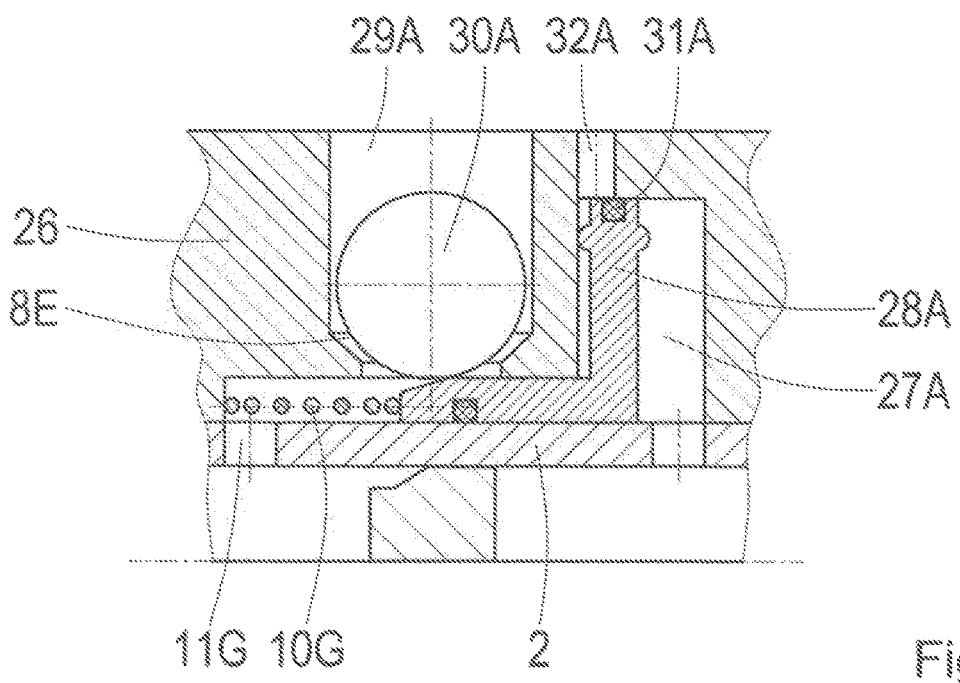
FIG. 8A an additional view of the fifth example design variant in accordance with FIG. 8.

FIGS. 8 and 8A show the fifth design variant, which is similar to the operating principle of the fourth example design variant, but is modified in terms of structure. In this case as well, the stop valve features a multi-part locking body with a piston element 28A arranged in a first annular space 27A subjected to control pressure, and with a spherical closure element 30A arranged in a second annular space 29A that is subjected to actuating pressure. The piston element 28A is in operative connection with the closure element 30A. The closure element 30A is also in operative connection with a valve seat 8E. In contrast to the fourth example design variant, with the fifth example design variant, the piston element 28A is structurally modified in that the end of the piston element 28A turned towards the closure element 30A features a shape adapted to the spherical shape of the closure element 30A. As a result, the closure element 30A is lifted radially outwardly from the valve seat 8E when the piston element 28A is subjected to control pressure.

FIG. 8 shows the closed position; FIG. 8A shows the position releasing the feed channel 11G.

A sealing element 31, 31A is provided to seal against the environment the first annular space 27, 27A that is subjected to control pressure. A vent 32, 32A is provided for venting the first annular space 27, 27A.

Figure 9A:
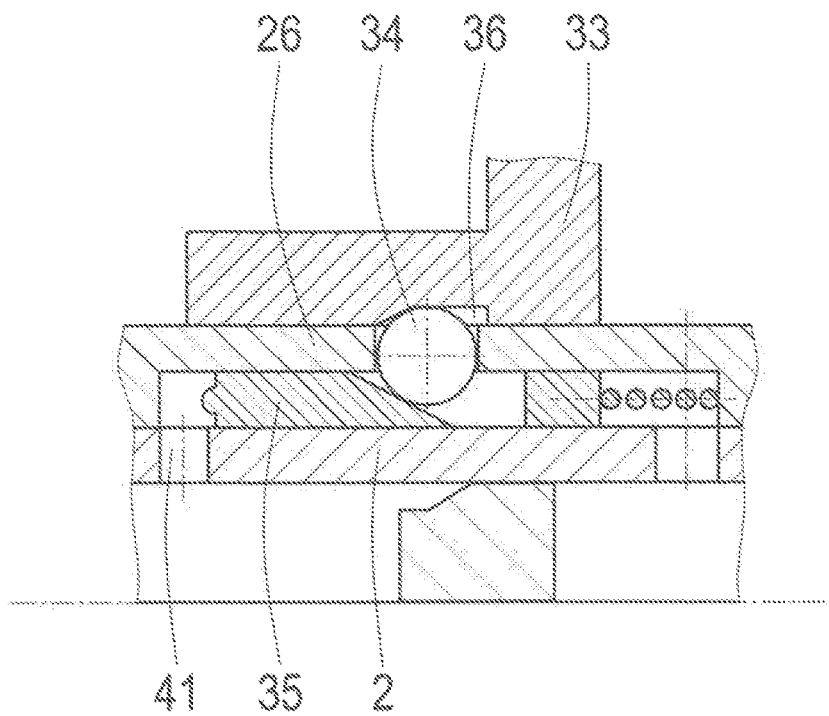
FIG. 9A an additional view of the sixth example design variant in accordance with FIG. 9.

FIGS. 9 and 9A show a sixth design variant of the arrangement in accordance with example aspects of the invention, with which the locking element features at least one locking body that can be subjected to control pressure for mechanically locking and releasing the shifting position of the shifting element or the clutch 1, 1A. In FIGS. 9 and 9A, only the clutch piston 33 actuating the clutch 1, 1A is shown. As a locking body, a spherical latching element 34 is provided, which is in operative connection with an actuating element 35 that can be subjected to control pressure, such that, when the actuating element 35 is subjected to control pressure by a control pressure channel 41 and when the clutch 1, 1A is closed, the spherical latching element 34 can be brought into a position locking the clutch pistons 33 in a positive-locking or force-fitting manner. This is achieved by the fact that the spherical latching element 34 engages in a corresponding recess or locking groove 36 on the side of the clutch piston 33 turned towards the latching element 34.

FIG. 9 shows the released position; FIG. 9A shows the locked or latched position, with which, based on the actuating element 35 subjected to control pressure, the latching element 34 engages in a positive-locking manner in the recess 36 of the clutch piston 33. As long as the actuating element 35 is subjected to control pressure, the clutch piston 33 is thereby held or locked in the shifting position, such that the actuating pressure acting on the clutch piston 33 can be reduced or eliminated.

Figure 10:
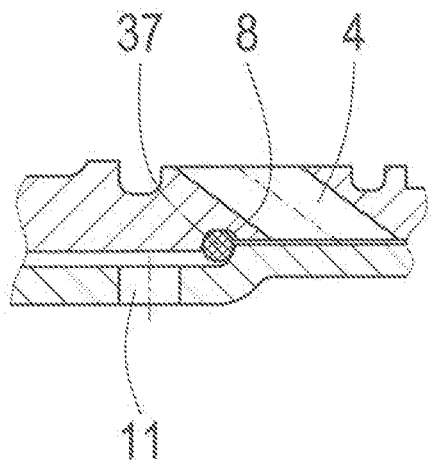
FIGS. 10 to 11A various designs of alternative sealing elements of the arrangement in accordance example aspects of with the invention.
Figure 10A:
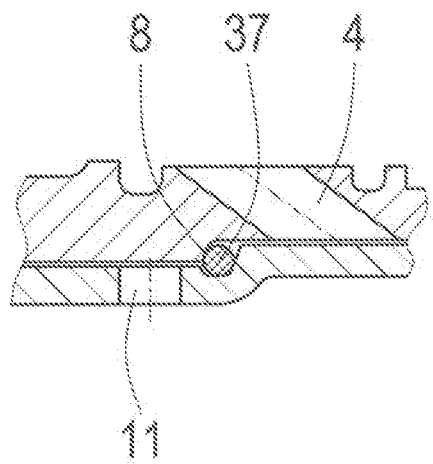

FIGS. 10, 10A, 11 and 11A show various embodiments of the sealing element, which seals the valve seats 8 to 8F. In FIGS. 10 and 10A, an O-ring 37 is provided as a sealing element, while, in FIGS. 11 and 11A, a vulcanized sealing element 38 designed in a plate shape or the like (for example) is provided.

Figure 11:
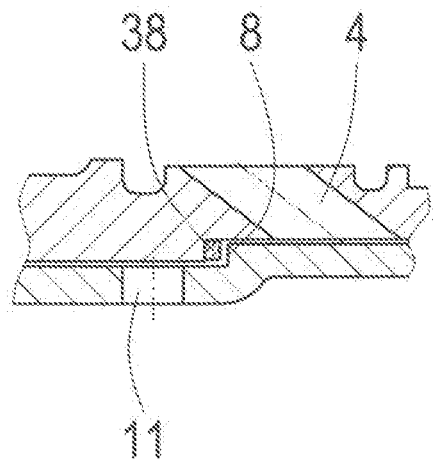
Figure 11A:
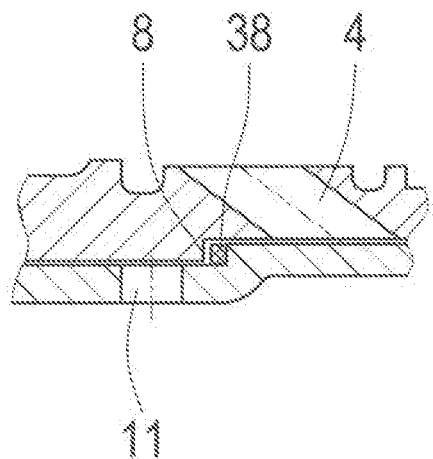

In FIG. 10, the O-ring 37 is arranged in an axially fixed manner on the clutch side in a corresponding groove, while, in FIG. 10A, the O-ring is arranged in an axially fixed manner on the side of the locking body in a groove. In FIG. 11, the vulcanized sealing element 38 is formed on the clutch side, while, in FIG. 11A, the vulcanized sealing element 38 is vulcanized on the on the side of the locking body.

Modifications and variations can be made to the embodiments illustrated or described herein without departing from the scope and spirit of the invention as set forth in the appended claims.

REFERENCE SIGNS 1,1A Clutch or shifting element
2 First transmission shaft
3 Transmission housing
4,4A,4B Fluid chamber or clutch cylinder to be locked
5,5A Axial bore
6,6A Guide sleeve
7 Piston
8,8A,8B,8C,8D,8E,8F,8G Valve seat
9,9A Pressure chamber
10,10A,10B,10C,10D,10E,10F,10G Restoring element
11,11A,11B,11C,11D,11E,11F,11G Feed channel for actuating pressure
12 Actuating piston
13 Closure piston
14 Additional spring element for actuating piston
15,15A Annular space
16 Sleeve-shaped piston element
17 Ring-shaped actuating piston
18 Pin
19 Closure sleeve
20 Common control pressure connection
21 First annular space
22 Housing stub
23 Second annular space
24,24A Unlocking piston
25,25A Closure element
26 Second transmission shaft
27,27A First annular space
28,28A Piston element
29,29A Second annular space
30,30A Spherical closure element
31,31A Sealing element
32,32A Vent
33 Clutch piston
34 Latching element
35 Actuating element
36 Recess or locking groove
37 O-ring
38 Vulcanized sealing element
39 Rectangular ring
40,40A Area subjected to control pressure
41 Control pressure channel

The invention claimed is:

1. A system for locking and releasing a shifting position of a shifting element that is hydraulically actuatable by an actuating pressure, the shifting element arranged coaxially with a transmission shaft in a transmission housing of an automatic transmission of a vehicle, the system comprising:
a return flow locking valve for selectively locking and releasing the shifting position of the shifting element, the return flow locking valve subjectable to a control pressure that is separate from the actuating pressure of the shifting element, the return flow locking valve arranged radially inward relative to the shifting element in the transmission housing.

2. The system of claim 1, wherein the return flow locking valve comprises at least one locking body that is subjectable to the control pressure such that the at least one locking body hydraulically locks and releases a fluid chamber in response to the control pressure, the fluid chamber subjectable to the actuating pressure of the shifting element.

3. The system of claim 2, wherein the return flow locking valve is arranged in an axial bore of the transmission shaft.

4. The system of claim 3, wherein the return flow locking valve comprises a piston that is axially movable in the axial bore and selectively engages a valve seat of the axial bore, a pressure chamber subjectable to the control pressure operatively connected with a first end of the piston, a restoring element is operatively connected with a second end of the piston, the piston axially displacing from a valve seat position when subjected to the control pressure in order to release a feed channel of the fluid chamber.

5. The system of claim 4, wherein the restoring element is a plate spring or a wave spring.

6. The system of claim 3, wherein the return flow locking valve comprises a multi-part locking body with an axially movable actuating piston and an axially movable closure piston, the actuating piston subjectable to the control pressure, the closure piston selectively engaging a valve seat of the axial bore, the actuating piston in operative connection with the closure piston when subjected to the control pressure such that the closure piston moves to a valve seat position that releases a feed channel of the fluid chamber against a force of a restoring element.

7. The system of claim 2, wherein the return flow locking valve is arranged radially between the transmission shaft and the fluid chamber of the shifting element, the fluid chamber being a clutch cylinder of the shifting element.

8. The system of claim 7, wherein the return flow locking valve is arranged in an annular space formed between a guide sleeve and the shifting element, the guide sleeve arranged coaxially with the transmission shaft.

9. The system of claim 8, wherein the return flow locking valve comprises a sleeve-shaped piston, the sleeve-shaped piston axially movable in the annular space, the sleeve-shaped piston selectively engaging a valve seat of the annular space.

10. The system of claim 9, wherein a first end of the sleeve-shaped piston is connected with an area of the annular space that is subjectable to the control pressure, a second end of the sleeve-shaped piston is connected with a restoring element, the sleeve-shaped piston displaceable into a valve seat position that releases a feed channel of the fluid chamber when subjected to the control pressure.

11. The system of claim 8, wherein the return flow locking valve comprises a multi-part locking body that is axially movable into the annular space, the multi-part locking body comprising a ring-shaped actuating piston, at least one pin and a closure sleeve, the at least one pin operatively connected with the actuating piston, the closure sleeve operatively connected with the at least one pin and a valve seat.

12. The system of claim 11, wherein the actuating piston is arranged in an area of the annular space that is subjectable to the control pressure, the closure sleeve urged against the valve seat by a restoring element, the actuating piston moving the closure sleeve into a valve seat position that releases the feed channel when subjected to the control pressure.

13. The system of claim 2, wherein at least one O-ring is provided on a side of the shifting element or the locking body for hydraulic sealing of the feed channel.

14. The system of claim 2, wherein at least one vulcanized seal is provided on a side of the shifting element or the locking body for hydraulic sealing of the feed channel.

15. The system of claim 2, wherein the return flow locking valve is arranged in a space of a second transmission shaft that is subjectable to the control pressure, the second transmission shaft arranged coaxially with a first transmission shaft.

16. The system of claim 15, wherein the return flow locking valve comprises at least one locking body that is subjectable to the control pressure for mechanically locking and releasing of the shifting position of the shifting element.

17. The system of claim 16, wherein a spherical latching element is operatively connected to an actuating element that is subjectable to the control pressure, the spherical latching element movable into a position that locks the shifting element in a positive-locking or force-fitting manner when the actuating element is subjected to the control pressure and when the shifting element is closed.

18. The system of claim 1, wherein the return flow locking valve, a guide sleeve, and the shifting element are rotatably mounted on the transmission shaft.

19. The system of claim 1, wherein the return flow locking valve is a plurality of return flow locking valves and the shifting element is a plurality of shifting elements, each of the plurality of return flow locking valves selectively releasing and locking a respective feed channel of the plurality of shifting elements, each of the plurality of return flow locking valves controllable through a common control pressure connection.

20. The system of claim 19, wherein a first return flow locking valve of the plurality of return flow locking valves and a first guide sleeve are arranged on a housing stub and within a first annular space radially inset from a first shifting element of the plurality of shifting elements, a second return flow locking valve of the plurality of return flow locking valves arranged in a second annular space between a second guide sleeve connected to the transmission shaft and the plurality of shifting elements.

21. The system of claim 19, wherein each return flow locking valve of the plurality of return flow locking valves comprises a multi-part locking body, an unlocking piston and a ring-shaped closure element, the multi-part locking body axially movable in an associated annular space with the unlocking piston and the ring-shaped closure element, a first end of the unlocking piston is operatively connected to the common control pressure port, a second end of the unlocking piston is in operative connection with a closure element that is pretensioned against a valve seat by a restoring element, the closure element movable into a valve seat position by the respective unlocking piston when subjected to the control pressure in order to release the respective feed channel of the plurality of shifting elements.

22. The system of claim 1, wherein the return flow locking valve is arranged within a second transmission shaft that is arranged coaxially with a first transmission shaft.

23. The system of claim 22, wherein the return flow locking valve is a plurality of return flow locking valves, the return flow locking valves of the plurality of return flow locking valves arranged axially adjacent each other in the second transmission shaft.

24. The system of claim 22, wherein the return flow locking valve comprises a multi-part locking body with a piston and a spherical closure element, the piston arranged in a first annular space that is subjectable to the control pressure, the spherical closure element arranged in a second annular space that is subjectable to the actuating pressure, the second annular space having a valve seat, the piston in operative connection with the spherical closure element that rests against the valve seat, the spherical closure element movable by the piston counter to the force of a restoring element into a valve seat position that releases a respective feed channel when the first annular space is subjected to the control pressure.

25. The system of claim 24, wherein an end of the piston that is turned towards the spherical closure element has a shape that is complementary to the spherical closure element.

26. The system of claim 1, wherein the return flow locking valve comprises a cone valve seat or a plate valve seat.

\* \* \* \* \*